United States Patent Office 3,422,014
Patented Jan. 14, 1969

3,422,014
SYNTHETIC LUBRICANT COMPOSITION OF IMPROVED OXIDATION STABILITY
Alan D. Forbes, Knaphill, Woking, and Patrick Gould, Woodham, near Weybridge, England, assignors to The British Petroleum Company Limited, London, England, a corporation of England
No Drawing. Filed Jan. 17, 1966, Ser. No. 520,886
Claims priority, application Great Britain, Jan. 15, 1965, 1,868/65
U.S. Cl. 252—37      6 Claims
Int. Cl. C10m 3/22

This invention relates to synthetic lubricants suitable for use at very high temperatures such as occur in modern aero gas turbines.

Lubricants used in modern jet aircraft, particularly supersonic aircraft, have to operate at high bulk oil temperatures (in the region of 200° C. or more) which have the effect of greatly accelerating the thermal and oxidative deterioration of the lubricant.

It is well-established that organo-metallic compounds can catalyse the degradation of lubricant base-fluids. However, there are also a few references in the literature which suggest that metal organic, acid salts or complexes can act as anti-oxidants. There appears to have been little investigation to determine the optimum concentrations at which the salts or complexes should be used.

It is known that the majority of the metallic elements react to form complexes which contain a considerable range of ligands, ranging from halogen ligands to, for example, ammonia ligands. The oxidation states of the metallic elements involved can range from zero to high positive values.

A considerable number of base fluids for lubricants which have to withstand the severe conditions mentioned above have been proposed. Examples of such lubricants are the siloxanes, the polyphenyl ethers and the aliphatic esters. Although some research has been carried out and published relating to the degradative oxidation of mineral base oils, little work has been published on the degradative oxidation of ester base fluids or successful methods for their protection proposed at high temperature, for example, above 200° C.

A recent British patent specification, No. 942,161, suggests that aliphatic ester base-fluids in general may be protected from oxidative degradation by compositions containing metal complexes. The compositions proposed comprise a pyridylamine and/or a triazine in combination with a complex of such an organic nitrogen compound with a copper salt of a fatty acid, the mole ratio of total organic nitrogen compound to copper metal being between 2 and 75. It appears from this specification that only compositions which contain a pyridylamine or a triazine, preferably in excess, are effective. The lubricant composition preferably comprises 0.05–10%, more preferably 0.1–4% by weight based on the total composition, of each of the additives.

It is known that base oils consisting of certain esters of polyhydric alcohols having no beta hydrogen atoms, for example, trimethylolpropane, are not sufficiently resistant to oxidation at the high temperatures in question.

We have now found, surprisingly, that novel lubricating compositions of improved oxidation stability at temperatures of 200° C. and higher can be produced by adding certain organo-metallic compounds to esters of polyhydric alcohols having no beta hydrogen atoms, for example, trimethylolpropane.

According to the invention, there is provided a lubricating composition based on a liquid neutral ester having at least two ester linkages per molecule, that has been prepared by reacting together under esterification conditions and in one or more stages;

(a) a mono- and/or polyhydric alcohol having from 5 to 15, preferably from 5 to 8, carbon atoms per molecule and having no hydrogen atoms attached to any carbon atoms in a $\beta$-position with respect to an —OH group and (b) a mono- and/or polycarboxylic acid having from 2 to 14, preferably from 6 to 10, carbon atoms per molecule, the ester having dissolved therein an organometallic compound, as hereinafter defined, in an amount which gives a metal content of up to 500 parts per million (p.p.m.), preferably from 1 to 15 p.p.m., based on the total weight of the composition.

It is to be understood that the composition may contain more than one of each of the ingredients stated i.e. more than one ester and/or more than one organometallic compound. It is also to be understood that in the esterification reaction described above there may be used more than one of any of the reactants mentioned, for example, a mixture of monocarboxylic acids. In any case, the neutral ester product of the esterification reaction will sometimes consist of a mixture of different ester molecules so the expression "ester" is to be construed accordingly. The term "neutral ester" is used to mean a fully esterified product.

Examples of suitable acids and alcohols that may be used in the preparation of the ester base oil are: caprylic acid, capric acid, caproic acid, enanthic acid, pelargonic acid, adipic acid, sebacic acid, azelaic acid, tricarballylic acid, 2:2:4-trimethylpentanol, neopentyl alcohol, neopentyl glycol, trimethylolpropane and pentaerythritol.

Examples of esters that are particularly suitable as thermally stable base oils are:

(a) esters of trimethylolpropane and pentaerythritol with one or more of the monocarboxylic acids mentioned in the previous paragraph and
(b) complex esters or polyesters prepared from trimethylolpropane, sebacic and/or azelaic acid, and one or more of the monocarboxylic acids mentioned in the previous paragraph. Complex esters of this type are described in U.K. patent specification 971,901.

The organo-metallic compounds present in the compositions according to the invention are those compounds which oxidise or reduce the organic radicals formed during oxidative degradation of esters, that is, salts of aliphatic acids having more than eight carbon atoms or complexes in which the ligands are composed of any or all of the elements carbon, hydrogen, oxygen and nitrogen. Suitable metals are the transition metals, especially the first transition series (according to the Periodic Table based on that of Mendeleeff), and the non-transition metals such as cerium, which metals can take part in "electron transfer" reactions. It is preferred to use those metals in which the oxidation potential of a couple between a lower and a higher oxidation state is greater than or equal to $+0.75$ (using the British sign convention and couples in acid solution). The organo-metallic compound must not be so volatile that it is distilled or evaporated out of the lubricating compositions at high temperatures, for example, above 200° C. It must be soluble in the base oil.

The preferred transition metals are manganese and cobalt, though chromium or iron could also be used. Copper has been found to be a suitable transition metal. Cerium is a suitable non-transition metal.

The preferred complexes are the acetylacetonates, especially the hydrated acetylacetonates, for example, manganous and cobaltous acetylacetonates. Cupric phthalocyanine has also been found to be suitable.

A suitable copper salt is cupric stearate.

Although the compounds described above have excellent high temperature anti-oxidant properties when used by themselves, the compositions may also include other lubricant additives, for example, metal deactivators and load carrying additives, in amounts sufficient for the particular purpose, and conventional antioxidants that are primarily effective at low temperatures, for example aromatic amine antioxidants.

An unusual and surprising aspect of the present lubricating composition is that the organo-metallic compounds are effective in extremely small amounts. This is an important advantage from the point of view of the cost of the composition. The maximum quantity suitable is 500 p.p.m. and the preferred range is from 1 to 15 p.p.m. of metal, based on the total weight of the composition.

By way of example, high temperature oxidation tests were carried out on two aliphatic ester base oils of the type described above and on the same base oils inhibited with cupric phthalocyanine. The oxidation test consisted in blowing air at a rate of 15 litres per hour through a 6 gram sample of the oil held at a high temperature for five hours. The oxidation stability was determined by measuring the viscosity and acidity increases in the oil due to the test and the amount of oxygen absorbed. The results given in the following table illustrate that at temperatures of 200° C. and higher the organometallic compound retards the oxidation of the aliphatic esters.

TABLE 1.—BASE FLUID—TRIMETHYLOLPROPANE TRICAPRYLATE

| Temperature (° C.) | Metal content (p.p.m.) | Time* (hrs.) | Volume O₂ consumed (ml.) | KV₂₁₀ increase (percent) | Acidity increase (mg. KOH/g.) |
|---|---|---|---|---|---|
| 200 | 0 | 0.17 | 1,940 | 3,900 | 55.2 |
| 200 | 10 | 0.25 | 910 | 2,200 | 31.5 |

*Time required for 0.5 mole O₂ to be adsorbed by 500 g. sample.

TABLE 2.—BASE FLUID—COMPLEX ESTER ESF/3/6B

[Complex ester ESF/3/6B is a mixture of esters synthesised from caprylic acid (11 moles), trimethylolpropane (4.3 moles) and sebacic acid (1 mole) and blended with 4 percent weight p,p'-dioctyldiphenylamine (a known antioxidant) plus 0.25 percent weight benzotriazole (a known metal deactivator)]

| Temperature (° C.) | Metal content (p.p.m.) | Time* (hrs.) | Volume O₂ consumed (ml.) | KV₂₁₀ increase (percent) | Acidity increase (mg. KOH/g.) |
|---|---|---|---|---|---|
| 231 | 0 | 1.2 | 153 | 49.6 | 4.3 |
| 231 | 10 | 4.8 | 129 | 48.5 | 2.4 |

*Time required for 0.5 mole O₂ to be adsorbed by 500 g. sample.

We claim:
1. A lubricating composition consisting essentially of a blend of
   (A) a liquid aliphatic ester consisting of at least one neutral polyester having at least two ester linkages per molecule prepared by reacting together under esterification conditions in at least one stage;
      (1) an alcohol selected from the group consisting of a monohydric and polyhydric alcohol having from about 5 to about 15 carbon atoms per molecule and having no hydrogen atom attached to any carbon atom in a beta position with respect to any —OH group, and
      (2) a carboxylic acid selected from the group consisting of monocarboxylic acids and polycarboxylic acids having from about 2 to about 14 carbon atoms per molecule,
   and
   (B) at least one organo-metallic compound selected from the group consisting of
      (1) salts of carboxylic acids containing from 8 to 22 carbon atoms,
      (2) complexes of beta di-ketones having the formula

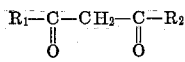

wherein R₁ and R₂ are lower alkyl groups containing from 1 to 10 carbon atoms, and
      (3) complexes of phthalocyanines, wherein the metal component of said organo-metallic compound is selected from the group consisting of metals of the first transition series according to the Periodic Table of Mendeleeff and cerium, said organo-metallic compound being present in an amount which produces a metal content of up to 500 parts per million, based on the total weight of the lubricating composition.

2. The lubricating composition of claim 1, wherein the said organo-metallic compound is present in an amount which gives a metal content of from 1 to about 15 parts per million, based on the total weight of the composition.

3. A lubricating composition in accordance with claim 1, wherein the metal component of the said organo-metallic compound is cobalt.

4. A lubricating composition in accordance with claim 1, wherein the metal component of the said organo-metallic compound is manganese.

5. A lubricating composition in accordance with claim 1, wherein the metal component of the said organo-metallic compound is copper.

6. A lubricating composition in accordance with claim 1, wherein the metal component of the said organo-metallic compound is cerium.

References Cited

UNITED STATES PATENTS

| 2,465,296 | 3/1949 | Swiss | 252—49.7 |
| 2,539,504 | 1/1951 | Zisman et al. | 252—37 |
| 3,003,859 | 10/1961 | Irish et al. | 252—42.7 |
| 3,018,248 | 1/1962 | Foehr | 252—37 |
| 3,023,164 | 2/1962 | Lawton et al. | 252—49.7 |
| 3,093,585 | 6/1963 | Low et al. | 252—37 |

FOREIGN PATENTS 934,720  8/1963  Great Britain.

DANIEL E. WYMAN, *Primary Examiner.*

W. H. CANNON, *Assistant Examiner.*

U.S. Cl. X.R.

252—42.7, 49.7, 56, 400